(12) United States Patent
Drew (10) Patent No.: US 7,055,656 B2
(45) Date of Patent: Jun. 6, 2006

(54) APPARATUS FOR RESTRAINING CABLE CURVATURE

(75) Inventor: Errol Drew, Northampton (GB)

(73) Assignee: Delta Cycle Corporation, Foxborough, MA (US)

( * ) Notice: Subject to any disclaimer, the term of this patent is extended or adjusted under 35 U.S.C. 154(b) by 0 days.

(21) Appl. No.: 10/832,652

(22) Filed: Apr. 26, 2004

(65) Prior Publication Data

US 2005/0029059 A1   Feb. 10, 2005

Related U.S. Application Data

(60) Provisional application No. 60/531,368, filed on Dec. 19, 2003, provisional application No. 60/465,440, filed on Apr. 25, 2003.

(51) Int. Cl.
    *B65H 59/16*     (2006.01)
    *F16C 1/26*      (2006.01)

(52) U.S. Cl. ............ 188/65.1; 74/502.3; 74/502.6

(58) Field of Classification Search ......... 188/24.11, 188/65.1; 74/501.5 R, 502.3, 502.5, 502.6, 74/502.4
See application file for complete search history.

(56) References Cited

U.S. PATENT DOCUMENTS

| | | | |
|---|---|---|---|
| 1,836,822 A * | 12/1931 | Sneed | 74/502.5 |
| 1,939,766 A | 12/1933 | Corset | 74/39 |
| 2,441,719 A * | 5/1948 | Potter | 74/502.3 |
| 2,761,297 A * | 9/1956 | Buchsteiner | 74/502.5 |
| 3,096,962 A | 7/1963 | Meijs | 248/276 |
| 3,196,706 A * | 7/1965 | Sevrence | 74/500.5 |
| 3,298,243 A * | 1/1967 | Geissler et al. | 74/502.3 |
| 3,546,961 A | 12/1970 | Marton | 74/501 |
| 4,380,178 A | 4/1983 | Bennett et al. | 74/501 P |
| 4,949,927 A | 8/1990 | Madocks et al. | 248/276 |
| 5,091,141 A | 2/1992 | Feuillet | 376/260 |
| 5,174,164 A | 12/1992 | Wilheim | 73/866.5 |
| 5,448,926 A | 9/1995 | Reasoner | 74/500.5 |
| 6,250,175 B1 * | 6/2001 | Noetzold | 74/502.3 |
| 6,606,921 B1 | 8/2003 | Noetzold | 74/502.3 |

FOREIGN PATENT DOCUMENTS

EP   0 832 364 B1   6/2003

OTHER PUBLICATIONS

Nokon Products Brochure, Cables and Housing for the 21st Century, Jul. 2002, 2 pgs.

* cited by examiner

*Primary Examiner*—Thomas Williams
(74) *Attorney, Agent, or Firm*—David J. Rikkers; Brown Rudnick Berlack Israels LLP (57) ABSTRACT

A pull cable can restrain cable curvature by the use of cable links configured to provide a limit to a range of an angular relationship between neighboring cable links. By limiting the angular variation between links, a minimum radius of the pull cable can be provided. The cable links can inhibit kinking of the inner cable by restricting the cable from reaching a small radius that could induce kinking.

29 Claims, 4 Drawing Sheets

APPARATUS FOR RESTRAINING CABLE CURVATURE

REFERENCE TO RELATED APPLICATIONS

This application claims priority to and the benefit of U.S. Provisional Patent Application, Ser. No. 60/465,440, filed Apr. 25, 2003, entitled A Method and Apparatus for Restraining Cable Curvature and U.S. Provisional Patent Application, Ser. No. 60/531,368, filed Dec. 19, 2003, entitled A Method and Apparatus for Restraining Cable Curvature, both of which are incorporated herein by reference.

FIELD OF THE INVENTION

The present invention generally relates to a method and apparatus for restraining cable curvature and, more particularly, to using cable links to restrict cable curvature.

BACKGROUND

Pull cables can be used to apply forces remotely. For example, some bicycles provide brake handles and shifting controls that are coupled to brake assemblies and gear shifters located elsewhere on the bicycle. The bicycle rider applies a force to the brake handle or shifting control, and the end of a pull cable attached to the brake handle or shifting control is moved, resulting in a corresponding movement of the other end of the pull cable, located at the brake assembly and/or gear shifter. These pull cables, also known as "Bowden cables" consist of two parts, an inner cable of twisted steel wire, and an outer cable housing.

Pull cables transmit force from one end of the cable to another end of the cable by a combination of tension on the inner cable and compression to the housing. In some installations, the outer cable housing does not run along the full length of the inner cable, but transmits the compressive force to a bicycle frame by means of housing stops, fittings with holes small enough for the cable, but not small enough for the housing to pass through. Some cable stops feature adjusting barrels.

In many installations, the path of the pull cable includes bends or curvatures. Along the curve, there is increased surface friction between the inner cable and the outer cable housing. This surface friction is due to the non-axial forces exerted at the curvature interface. Tensile force applied to the inner cable result in some force against the inside of the outer cable housing at bends or curves in the pull cable. The tensile force tends to work to straighten the inner cable, causing the inner cable to contact the outer cable housing where the pull cable bends. As the curve radius decreases or becomes more acute, a greater component of the tensile force may be applied to the inside of the outer cable housing. In addition, as a pull cable is drawn with more force over a curved section, the friction resistance becomes increasingly larger. Finally, when the curve becomes smaller than a certain radius or surface friction and/or tensile force become too high, the curve will collapse or kink and render the pull cable system less efficient or inoperative.

Recent pull cable systems replace and/or surround the outer cable housing with a plurality of form-parts so joined to one another as to form a continuous axial sheath around the inner cable. However, these recent pull cable systems can fail at certain curvatures. At decreased curve radii and/or at increased tensile forces, the form-parts may become unattached or out of alignment from each other at the curve, thereby allowing the inner cable to bend or even deform, and thus, greatly reduce the effectiveness of the pull cable system.

SUMMARY

In view of the limitations of the conventional pull cable methods and apparatuses, the present invention provides a method and apparatus for restraining cable curvature and, more particularly, to using interfacing cable links to restrict cable curvature.

According to an embodiment of the invention, each interfacing cable link has a restraining shape that, when compressive force is applied to the plurality of cable links, restricts the angular variation between links, thereby limiting curvature of the cable.

According to an illustrative embodiment of the invention, a cable curvature restraint apparatus is provided, having a first cable link with, at a first end, a first insertion and a first front end restrictor edge. At a second end, the first cable link has a first receptor and a first back end restrictor edge. A second cable link is provided with, at a first end, a second insertion and a second front end restrictor edge. The second insertion and second front end restrictor edge are configured to interface with the first receptor and the first back end restrictor edge to limit a range of angular travel between the cable links.

According to a further embodiment of the invention, a cable curvature restraint apparatus has a first cable link. The first cable link has a receptor and a back end restrictor edge. A second cable link has an insertion and a front end restrictor edge, configured to interface with the receptor and the back end restrictor edge of the first cable link to limit a range of angular travel between the first cable link and the second cable link. An outer sheath is located around an exterior surface of the cable links.

Another embodiment of the invention also provides a cable curvature restraint apparatus wherein a first cable link and a second cable link each have an inner minimum diameter located off center between the first end and the second end.

According to a further embodiment, a cable system is provided having a first cable link with a first insertion and a first front end restrictor edge and a first receptor and a first back end restrictor edge. A second cable link has a second insertion and a second front end restrictor edge. The second insertion and second front end restrictor edge are configured to interface with the first receptor and the first back end restrictor edge to limit a range of angular travel between the cable links. The cable system also includes a cable, positioned through the first end and the second end of the first cable link and the first end and the second end of the second cable link.

A further embodiment of the invention provides a method of controlling cable curvature. The method includes locating a first cable link on a cable. The first cable link has, at a first end, a receptor and a back end restrictor edge, and at a second end, an insertion and a front end restrictor edge. A second cable link is also located on the cable. The second cable link has an insertion and a front end restrictor edge. The second cable link is located to interface with the receptor and back end restrictor edge to limit a range of angular travel between the cable links.

BRIEF DESCRIPTION OF THE DRAWINGS

The invention will be better understood from the following detailed description of various embodiments of the invention with reference to the drawings, in which.

DETAILED DESCRIPTION

The present invention provides a device and method to provide cable links formed to limit a range of angular travel between the cable links. An inner cable passes through the cable links. When the inner cable is curved, the angular relationships between the cable links change and are limited by the interaction of the cable links. Optionally, an interior of the cable links may be formed to provide a minimum diameter located to ease curvature of the cable within the cable link.

Figure 1:
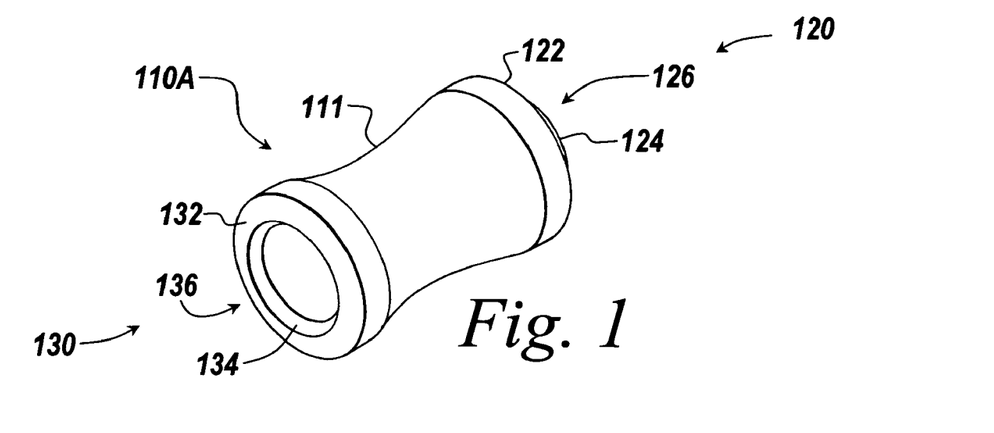
FIG. 1 is a rear quarter side perspective view of a cable link according to an embodiment of the invention.
Figure 2:
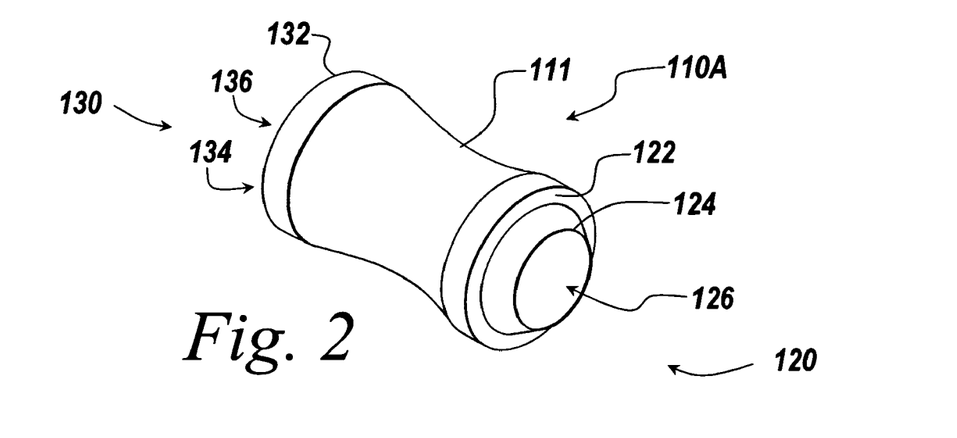
FIG. 2 is a front quarter side perspective view of the cable link of FIG. 1.

An illustrative embodiment of a cable link according to the invention is shown in FIGS. 1 and 2. The cable link 110A includes a front end 120, and a back end 130. The front end 120 may include a front end restrictor edge 122, an insertion 124 and a front opening 126. The back end 130 may include a back end restrictor edge 132, a receptor 134 and a back opening 136. As illustrated by way of example in FIGS. 1 and 2, the cable link 110A may be provided with an outside surface indentation 111, formed about a circumference of the cable link 110 A and extending along a majority of a length of the cable link 110A.

Figure 3:
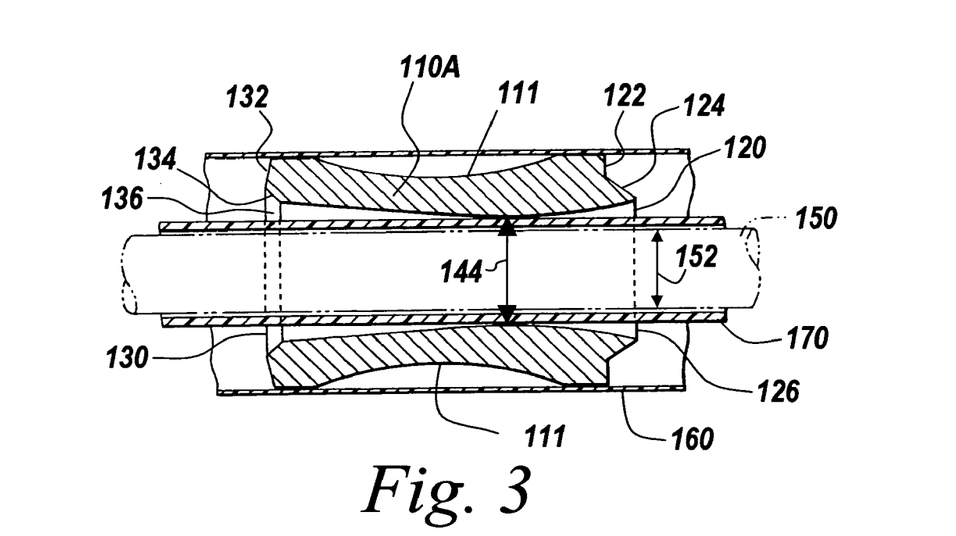
FIG. 3 is a side view partial cross-section of a single cable link surrounding an inner cable according to an embodiment of the invention, with the cable link shown in cross-section and the inner cable not sectioned.

As shown in FIG. 3, the interior of the cable link 110A is located between the back opening 136 and the front opening 126. In the illustrated embodiment, the interior of the cable link 110A has a diameter that gradually decreases from the front opening 126 to a minimum diameter 144 located off center toward the front opening 126. The interior diameter then increases from the minimum diameter 144 approaching the back opening 136. Optionally, the minimum diameter 144 may be located at approximately ⅓ of a total distance from the front opening 126 to the back opening 136. Also optionally, the minimum diameter 144 may be located between ⅕ and ⅖ of a total distance from the front opening 126 to the back opening 136. Alternatively, the minimum diameter 144 may be positioned at any location along the length of the cable link 110. It is understood that, in alternative embodiments, the diameter need not vary along the length of the cable link 110. Examples of material for forming the cable link 110 include, but are not limited to, aluminum, magnesium, zinc alloy, and/or moldable plastics including, but not limited to, polypropylene, nylon, polycarbonate, phenol-formaldehyde, epoxy, and the like.

Also shown in FIG. 3, is an inner cable 150, passing through the interior of the cable link 110A. Positioning of the minimum diameter 144 can aid in providing a smooth path for the inner cable 150, enabling movement of the cable link to maintain positioning of the cable links relative to each other, provide space to allow the inner cable 150 to bend and provide a location to receive lateral force from the inner cable 150 against the inside of the cable link in bends or curves. Examples of material for use as an inner cable 150 include, but are not limited to, steel, stainless steel and/or plastic composite materials, etc. According to the illustrated embodiment, the inner cable outside diameter 152 is smaller than the minimum diameter 144 of the interior of the cable link 110A. This can allow for ease of axial movement and/or rotation of the inner cable 150 relative to the cable link 110. However, the invention may be provided with an inner cable outside diameter 152 matching the minimum diameter 144 of the interior of the cable link 110A.

With further reference to FIG. 3, the inner cable 150 may be surrounded by an inner sheath 170. The inner sheath may be used to reduce surface friction of the inner cable, for protecting the inner cable from external elements such as dirt, water, oil, etc., and/or to enhance bending stiffness. Examples of material for forming the inner sheath include, but are not limited to, Teflon (PTFE), polyethylene, and/or nylon. An external diameter of the inner sheath 170 may be the same or less than the minimum diameter 144 of the interior of the cable link 110A. By making the external diameter of the inner sheath 170 at least slightly smaller than the minimum diameter 144 of the interior of the cable link, friction may be reduced between the cable link and inner sheath, to ease rotation of one or more cable links 100A about the inner sheath 170. The inner cable 150 may have an external diameter smaller than an inside diameter of the inner sheath 170. Such sizing can allow rotation and axial movement of the inner cable 150 relative to the inner sheath and cable links.

An external sheath 160 may be provided circumferentially around the cable links 110, as illustrated by way of example in FIG. 3. The external sheath 160 may provide a barrier to inhibit the entry of external elements such as dirt, water, oil, etc. among the cable links 110 and between the inner cable 150 and cable links 110. The external sheath 160 may also optionally enhance bending stiffness of the pull cable structure. Examples of material for forming the external sheath include, but are not limited to, Teflon (PTFE), polyethylene, and/or nylon. The external sheath 160 may be sized to axially align the cable links 110 to aid in positioning the cable links 110 to position the inner cable 150 within a series of cable links 110. The external sheath 160 may optionally be sized to inhibit sliding of the cable links 110 within the external sheath 160 to aid in positioning the cable links 110.

Figure 4:
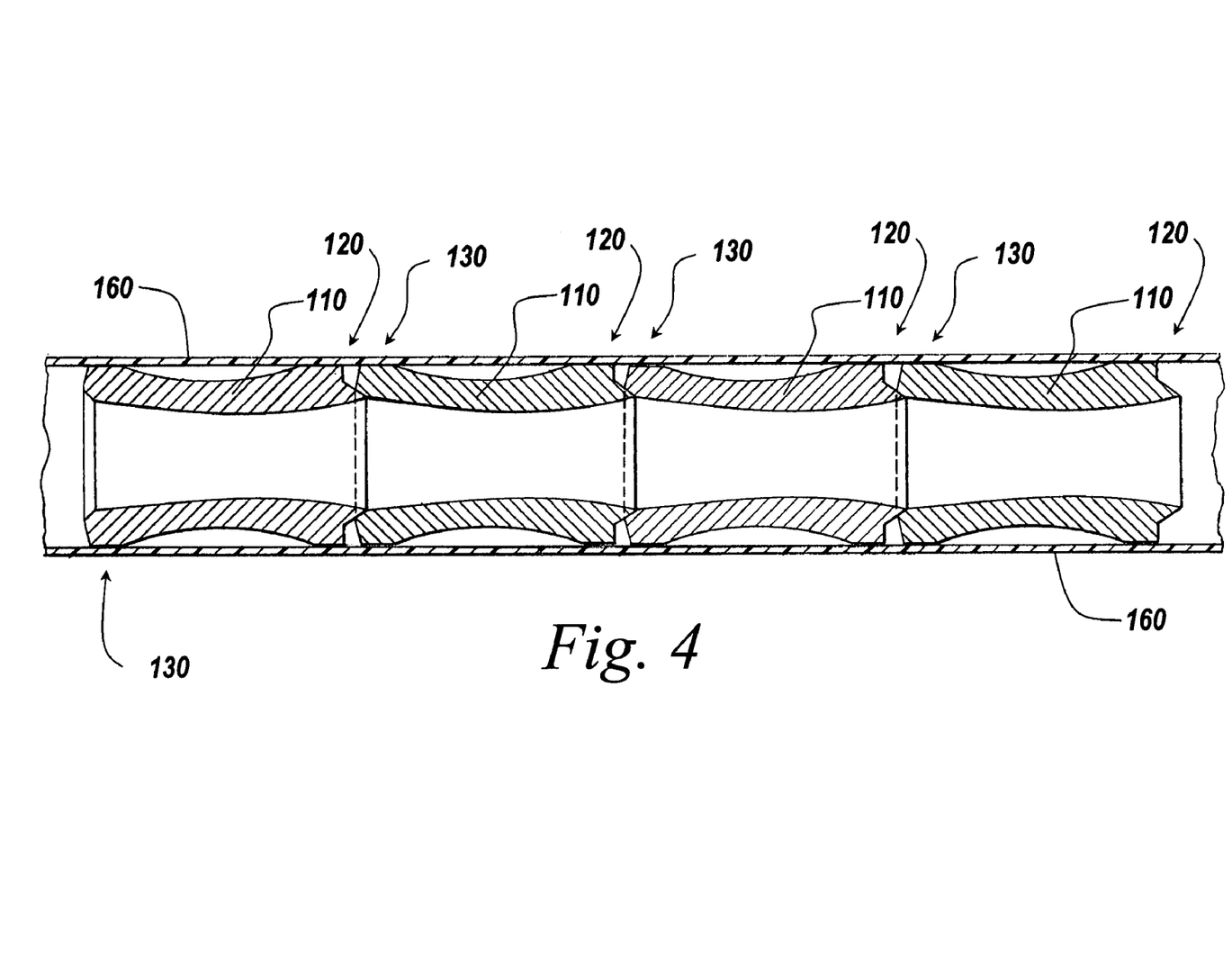
FIG. 4 is a side view cross-section of a plurality of cable links connected in a straight line, according to an embodiment of the invention.

FIG. 4 is a side view perspective of a plurality of cable links 110 connected along a straight line within an outer sheath 160. The cable links 110 each have a front end 120 and a back end 130. The front end 120 of each successive link 110 interfaces with the back end 130 of the next successive link. Each of the cable links 110 may have the same shape. Alternatively, the cable links 110 may be formed in different shapes. Optionally, different shapes may be located along the apparatus in an alternating or random pattern. In some embodiments, each cable link will provide limits to ranges of an angular relationship to neighboring cable links. However, it is understood that in some embodiments, not all cable links may provide limits of angular relationships to neighboring cable links.

Figure 5:
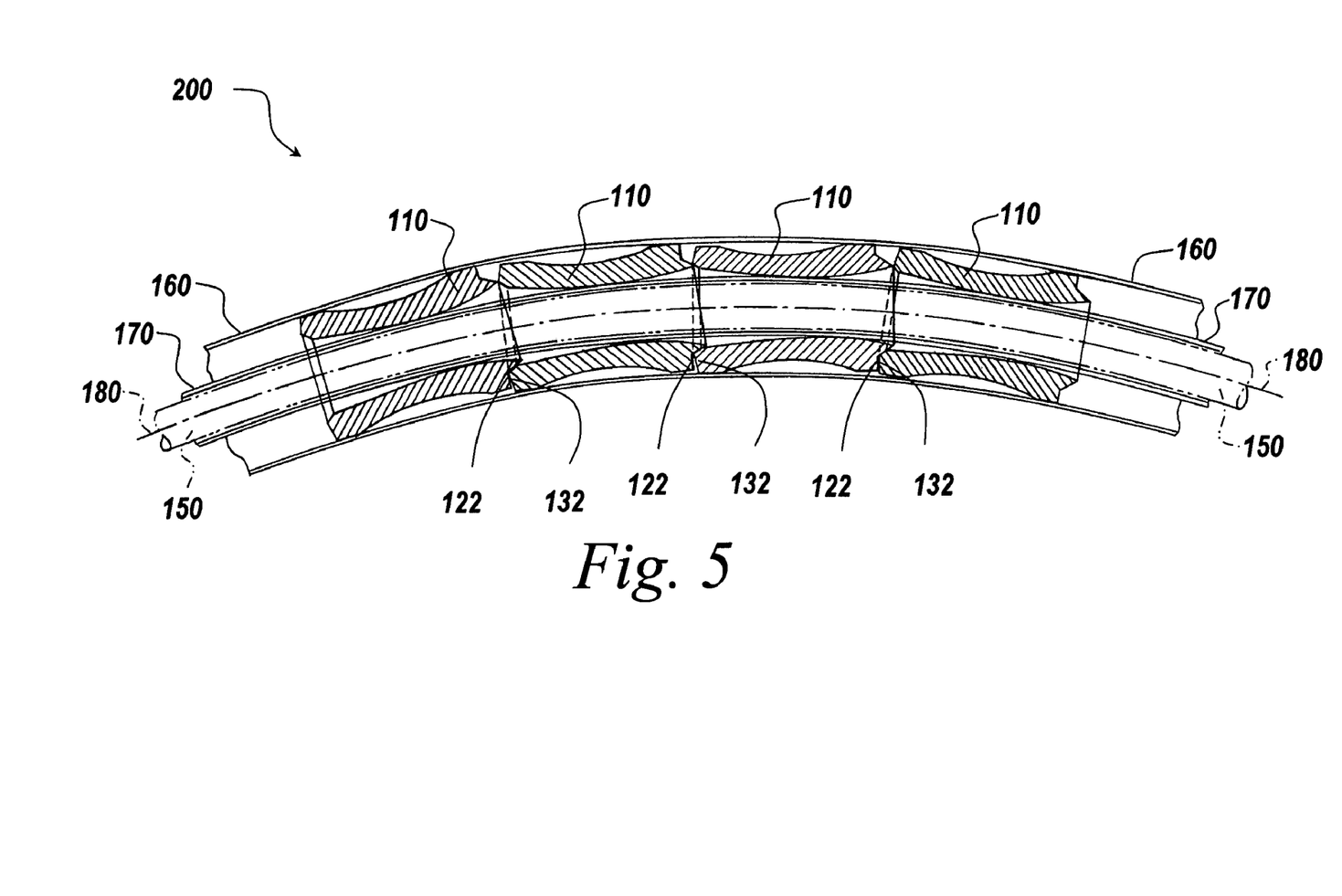
FIG. 5 is a side view partial cross-section of a plurality of cable links, according to an embodiment of the invention, connected over a curve and surrounding an inner cable, where the curvature of the inner cable is restricted, with the cable links shown in cross-section and the inner cable not sectioned.

FIG. 5 is a side, partial cross-section of a portion of a cable system 200 having plurality of cable links 110 connected over a curve 180 and surrounding an inner cable 150, where the curvature of the inner cable is restricted. The cable system 200 includes a plurality of cable links 110, an inner sheath 170 around an inner cable 150 and an outer sheath 160 around the cable links 110. The inner cable 150 typically extends from one end of the cable system 200 to another. A sufficient number of cable links 110 is provided to extend proximate to the ends of the inner cable, as is typically done with a conventional outer cable housing to couple a pull cable to the devices located at the end of the pull cable, while providing sufficient additional length of the inner cable 150 to allow for movement of the inner cable 150 relative to the cable links 110. For purposes of illustration, only a limited number of cable links 110 are shown in FIG. 5. According to the invention, the first and last cable links may be located to interface with a force actuator assembly, such as, for example, a brake handle or shifting control, and a force receiver assembly, such as, for example, a brake assembly or gear shifter, such that a force can be transmitted by a tensile force via the inner cable and compressive force via the cable links.

When tensile force is applied to the inner cable 150 and compressive force is applied to the cable links, the compressive force presses each link against the next successive link. In the illustrative embodiment, the range of angular relationship of the links is restricted by the front end restrictor edge 122 and the back end restrictor edge 132 of one or more cable links 110, interfacing with the corresponding front end restrictor edge 122 or back end restrictor edge 132 of the neighboring cable link 110, as shown in FIG. 5. The restricted angular relationship of the links results in restricting the curvature of the cable apparatus and the inner cable. If the cable links are not located along a curve, the front end restrictor edge 122 of one cable link may not contact the back end restrictor edge 132 of a neighboring cable link 110.

According to an example of the invention, the outside surface indentation 111 formed about a circumference of the cable link may provide a place for a portion of the outer sheath 160 to go when the inner cable 150 is curved. For example, the outer sheath 160 may bend and enter into the outside surface indentation 111. Also, the outer sheath 160 may wrinkle or buckle when curved and therefore enter into the outside surface indentation 111.

The length of each cable link can influence the minimum radius permitted when the cable assembly is pulled tight. Enlarging the length of a link can increase the collective radius formed by the series of cable links. Alternatively, reducing the length of the links can decrease the collective radius formed by the series of cable links.

The use of different individual cable link lengths within the cable apparatus can provide for different minimum radiuses within the cable apparatus. By adjusting the lengths of the links or the restrictor edges, the minimum radius may be changed at any position within the overall length of the cable apparatus.

Likewise, by adjusting the angle and/or shape of the front end and back end restrictor edges 122, 132 of particular successive cable links, the maximum allowable radius can be increased or decreased at a particular position within the cable. Changing individual front and back end restrictor edges 122, 132 within the cable apparatus can provide for different radiuses within the cable apparatus. Adjusting the front and back end restrictor edges, the radius may be changed at any given position within the total length of the cable apparatus.

The cable system 200 may be assembled in a wide variety of ways. For example, multiple cable links 110 may be located on an inner cable 150. An optional inner sheath 170 may be provided before or after the cable links 110 are located on the cable. Similarly, an optional outer sheath 160 may be provided before or after the cable links 110 are located on the inner cable 150. In one method, the cable links 110 may be aligned within an outer sheath 160 and then an inner sheath 170 and inner cable 150 are inserted through the interiors of the cable links 110.

Figure 6:
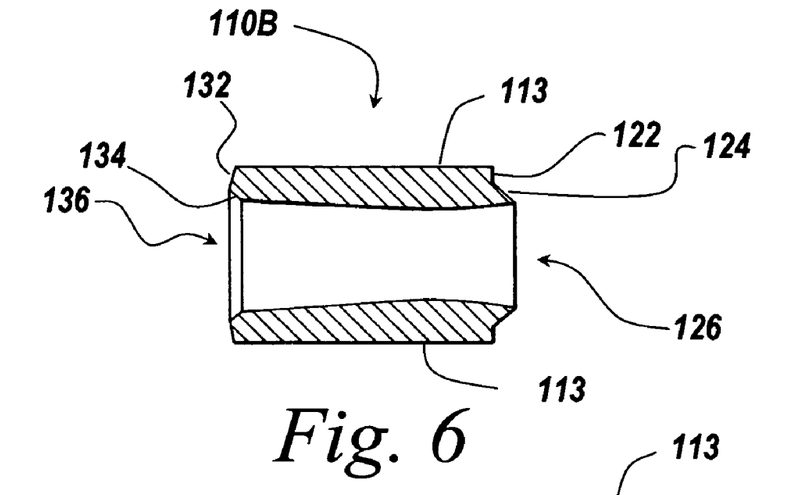
FIG. 6 is side view cross-section of a single cable link having a non-tapered outer surface, according to an alternative embodiment of the invention.
Figure 7:
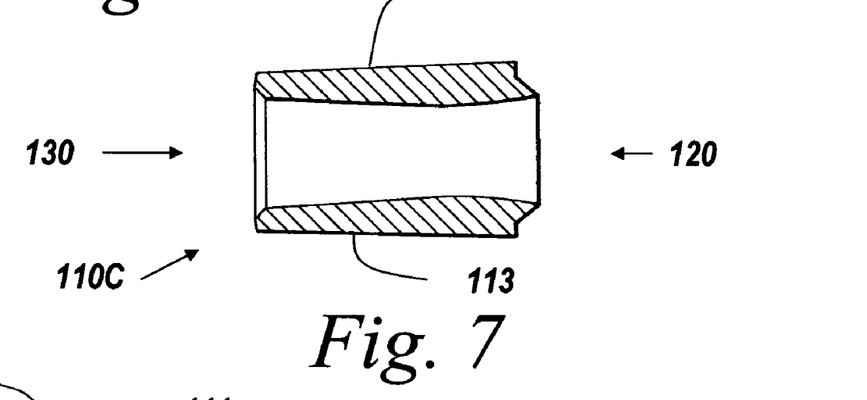
FIG. 7 is side view cross-section of a single cable link having a tapered outer surface, according to an alternative embodiment of the invention.

The cable link 110 may have a variety of shapes. Additional examples of outer surface configurations are shown in FIGS. 6 and 7. For example, the cable link 110 may be tapered along an outside surface 113 as shown by way of example in the cable link 100B in FIG. 6. It is understood that other portions of the cable link, such as the front end and back end restrictor edges 122, 132, the front and back opening 126, 136, the insertion 124 and/or the receptor 134, may be formed in shapes differing from those shown. In the illustrated embodiment, the front end restrictor edges 122, and back end restrictor edge 132 are proximate to an end of the cable link 110.

As illustrated by way of further example in FIG. 7, the exterior surface 113 of cable link 110C may also have a gradually decreasing diameter from the front end 120 to the back end 130.

Figure 8:
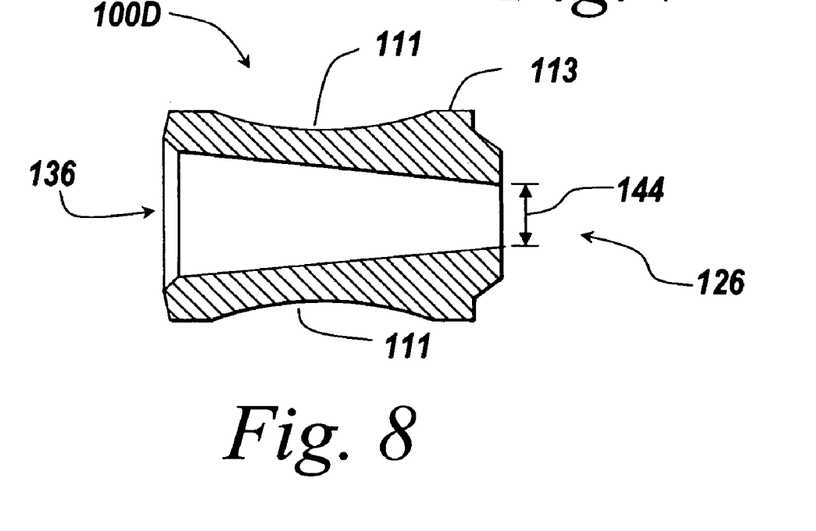
FIG. 8 is side view cross-section of a single cable link having a tapered inner surface, according to an alternative embodiment of the invention.

An example of a variation in an interior of a cable link is illustrated in FIG. 8. The cable link 100D has an interior with a tapering diameter, tapering downward from the back opening 136 to the front opening 126, providing a minimum diameter 144 at the front opening 126, in the illustrated example. It is understood that the invention is not so limited, as a non-tapered interior diameter may also be provided. Also, as noted above, a minimum diameter 144 may be located other than at an end of the interior, such as is illustrated in FIGS. 3–7.

It is understood that the invention is not limited to cable links having internal or external circular cross sections. Additional examples of internal and/or external cross sections can include, but are not limited to, ovals, squares, rectangles and polygons.

The cable link may be manufactured using an injection technique, although the invention is not so limited. A compound, such as, but not limited to, liquid metal, plastic compounds, etc, may be injected into a mold and then cooled. This manufacturing process produces highly consistent and uniform shaped links and thereby can provide the desired dimensions accurately for each of the cable links. Other examples of manufacturing processes can include, but are not limited to pour casting, machining or forging.

The present invention has been described by way of example, and modifications and variations of the described embodiments will suggest themselves to skilled artisans in this field without departing from the spirit of the invention. Aspects and characteristics of the above-described embodiments may be used in combination. For example, it is understood that features of the various cable link embodiments may be combined. The described embodiments are merely illustrative and should not be considered restrictive in any way. The scope of the invention is also to be measured by the appended claims and all variations and equivalents that fall within the range of the claims are intended to be embraced therein.

What is claimed is:

1. A cable curvature restraint apparatus, comprising:
a first cable link having, at a first end, a first insertion and a first front end restrictor edge, and at a second end, a first receptor and a first back end restrictor edge;
a second cable link having, at a first end, a second insertion and a second front end restrictor edge, configured to interface with the first receptor and the first back end restrictor edge to limit a range of angular travel between the first cable link and the second cable link; and
an outer sheath located around an exterior surface of the first cable link and the second cable link;
wherein the first cable link and the second cable link each have an outside surface indentation formed about a circumference and extending along a majority of a length of each of the first cable link and the second cable link, the outside surface indentation increasing in diameter approaching the first end and the second end from a minimum outside diameter located between the first end and the second end; and
wherein the outside surface indentation of each of the first cable link and the second cable link is adapted to receive a portion of the outer sheath during angular travel between the first cable link and the second cable link.

2. The cable curvature restraint apparatus of claim 1, wherein the second cable link, at a second end, has a second receptor and a second back end restrictor edge.

3. The cable curvature restraint apparatus of claim 1, further comprising:
a third cable link having, at a first end, a third insertion and a third front end restrictor edge,
wherein the second cable link, at a second end, has a second receptor and a second back end restrictor edge, configured to interface with the third receptor and the third back end restrictor edge to limit a range of angular travel between the second cable link and the third cable link.

4. The cable curvature restraint apparatus of claim 1, wherein the second front end restrictor edge is proximate to the first end of the second cable link.

5. The cable curvature restraint apparatus of claim 1, wherein the first cable link and the second cable link each have an inner diameter with a minimum diameter located off center toward the first end, the inner diameter increasing in at least one direction away from the minimum diameter.

6. The cable curvature restraint apparatus of claim 1, wherein the first cable link and the second cable link each have an inner diameter with a minimum diameter located at approximately ⅓ of a total distance from the first end to the second end, the inner diameter increasing in at least one direction away from the minimum diameter.

7. The cable curvature restraint apparatus of claim 1, further comprising:
an outer sheath located around an exterior surface of the first cable link and the second cable link; and
an inner sheath located in an interior of the first cable link and the second cable link;
wherein the first cable link has a minimum inner diameter located at approximately ⅓ of a total distance from the second end to the first end.

8. The cable curvature restraint apparatus of claim 1, wherein the first cable link and the second cable link each have a cylindrical outside surface.

9. The cable curvature restraint apparatus of claim 1, wherein the minimum outside diameter of the outside surface indentation of each of the first cable link and the second cable link is located at a mid-point between the first end and the second end along a length of each of the first cable link and the second cable link.

10. The cable curvature restraint apparatus of claim 1, further comprising an outer sheath located around an exterior surface of the first cable link and the second cable link.

11. The cable curvature restraint apparatus of claim 10, wherein the outer sheath is formed of polyethylene.

12. The cable curvature restraint apparatus of claim 1, further comprising an inner sheath located in an interior of the first cable link and the second cable link.

13. The cable curvature restraint apparatus of claim 12, wherein the inner sheath is formed of polyethylene.

14. The cable curvature restraint apparatus of claim 1, wherein the first cable link and second cable link are formed of zinc alloy.

15. The cable curvature restraint apparatus of claim 1, wherein the first cable link and second cable link are formed of aluminum.

16. A cable curvature restraint apparatus, comprising:
a first cable link having, a first end and a second end, and having at the second end, a receptor and a back end restrictor edge; and
a second cable link having a first end and a second end and having, at the first end, an insertion and a front end restrictor edge, configured to interface with the receptor and the back end restrictor edge to limit a range of angular travel between the first cable link and the second cable link;
wherein the first cable link and the second cable link each have an inner diameter with a minimum diameter located at approximately ⅓ of a total distance from the first end to the second end and continuously increasing from the minimum diameter to the first end and continuously increasing from the minimum diameter to the receptor.

17. The cable curvature restraint apparatus of claim 16, wherein the second front end restrictor edge is proximate to the first end of the second cable link.

18. The cable curvature restraint apparatus of claim 16, further comprising an inner sheath located in an interior of the first cable link and the second cable link.

19. The cable curvature restraint apparatus of claim 18, further comprising an outer sheath located around an exterior surface of the first cable link and the second cable link.

20. A cable curvature restraint apparatus, comprising:
a first cable link having a first end and a second end, and having at the second end, a receptor and a back end restrictor edge; and
a second cable link having a first end and a second end and having, at the first end, an insertion and a front end restrictor edge, configured to interface with the receptor and the back end restrictor edge to limit a range of angular travel between the first cable link and the second cable link;
wherein the first cable link and the second cable link each have an inner diameter with a minimum diameter located off center between the first end and the second end and continuously increasing from the minimum diameter to the first end and continuously increasing from the minimum diameter to the receptor.

21. The cable curvature restraint apparatus of claim 20, further comprising:
  an outer sheath located around an exterior surface of the first cable link and the second cable link; and
  an inner sheath located about the cable and in an interior of the first cable link and the second cable link.

22. A cable system, comprising:
  a first cable link having, at a first end, a first insertion and a first front end restrictor edge, and at a second end, a first receptor and a first back end restrictor edge;
  a second cable link having, at a first end, a second insertion and a second front end restrictor edge, configured to interface with the first receptor and the first back end restrictor edge to limit a range of angular travel between the first cable link and the second cable link;
  a third cable link having, at a first end, a third insertion and a third front end restrictor edge,
  a cable, positioned through the first end and the second end of the first cable link and the first end and the second end of the second cable link;
  an outer sheath located around an exterior surface of the first cable link and the second cable link; and
  an inner sheath located about the cable and in an interior of the first cable link and the second cable link;
  wherein the second cable link, at a second end, has a second receptor and a second back end restrictor edge, configured to interface with the third receptor and the third back end restrictor edge to limit a range of angular travel between the second cable link and the third cable link; and
  wherein the first cable link, the second cable link and the third cable link each have an outside surface indentation formed about a circumference and extending along a portion of a length of each of the first cable link, the second cable link and the third cable link and adapted to receive a portion of the outer sheath during angular travel between the first cable link, the second cable link and the third cable link.

23. The cable system of claim 22, wherein the second front end restrictor edge is proximate to the first end of the second cable link and the third front end restrictor edge is proximate to the first end of the third cable link.

24. The cable system of claim 22, wherein the first cable link, the second cable link, and the third cable link each have an inner diameter with a minimum diameter located off center toward the first end, the inner diameter increasing in at least one direction away from the minimum diameter.

25. The cable system of claim 22, wherein the first cable link, the second cable link, and the third cable link each have an inner diameter with a minimum diameter located at approximately ⅓ of a total distance from the first end to the second end.

26. The cable system of claim 22, wherein the outer sheath is formed of polyethylene.

27. The cable system of claim 22, wherein the inner sheath is formed of polyethylene.

28. The cable system of claim 22, wherein the first cable link, the second cable link and the third cable link are formed of zinc alloy.

29. A cable system, comprising:
  a first cable link having, at a first end, a first insertion and a first front end restrictor edge, and at a second end, a first receptor and a first back end restrictor edge;
  a second cable link having, at a first end, a second insertion and a second front end restrictor edge, configured to interface with the first receptor and the first back end restrictor edge to limit a range of angular travel between the first cable link and the second cable link;
  a third cable link having, at a first end, a third insertion and a third front end restrictor edge,
  a cable, positioned through the first end and the second end of the first cable link and the first end and the second end of the second cable link;
  an outer sheath located around an exterior surface of the first cable link and the second cable link; and
  an inner sheath located about the cable and in an interior of the first cable link and the second cable link;
  wherein the second cable link, at a second end, has a second receptor and a second back end restrictor edge, configured to interface with the third receptor and the third back end restrictor edge to limit a range of angular travel between the second cable link and the third cable link; and
  wherein the first cable link, the second cable link, and the third cable link each have an outside surface indentation formed about a circumference and extending along a majority of a length of each of the first cable link and the second cable link.

* * * * *

UNITED STATES PATENT AND TRADEMARK OFFICE
CERTIFICATE OF CORRECTION

PATENT NO. : 7,055,656 B2  Page 1 of 1
APPLICATION NO. : 10/832652
DATED : June 6, 2006
INVENTOR(S) : Drew et al.

It is certified that error appears in the above-identified patent and that said Letters Patent is hereby corrected as shown below:

Title Page:

Item (75), "Inventor: Errol Drew, Northampton (GB)" should read -- Inventor(s): Errol Drew, Northampton (GB), Philip J. Karl, Providence, RI --

Signed and Sealed this

Thirteenth Day of July, 2010

David J. Kappos
*Director of the United States Patent and Trademark Office*